United States Patent [19]
Gelfer et al.

[11] Patent Number: 6,163,596
[45] Date of Patent: Dec. 19, 2000

[54] PHONEBOOK

[75] Inventors: Yair Gelfer, Maccabim; Yoseph Otiker, Tel Aviv; Leon Eting, Maccabim, all of Israel

[73] Assignee: Hotas Holdings Ltd., Or Yehuda, Israel

[21] Appl. No.: 08/862,892

[22] Filed: May 23, 1997

[51] Int. Cl.[7] .............................. H04M 1/64; H04M 11/00
[52] U.S. Cl. ................. 379/67.1; 379/88.01; 379/88.03; 379/93.02; 379/93.34
[58] Field of Search ................................. 379/67.1, 88.01, 379/88.02, 88.03, 69, 76, 201, 202, 206, 211, 212, 93.02, 93.26, 93.34; 707/1–10

[56] References Cited

U.S. PATENT DOCUMENTS

| | | | |
|---|---|---|---|
| 4,481,382 | 11/1984 | Villa-Real | 455/556 |
| 4,734,931 | 3/1988 | Bourg et al. | 379/93.01 |
| 4,800,582 | 1/1989 | D'Agosto, III et al. | 379/216 |
| 4,817,129 | 3/1989 | Riskin | 379/88 |
| 4,827,500 | 5/1989 | Binkerd et al. | 379/88 |
| 4,853,953 | 8/1989 | Fujisaki | 379/88.03 |
| 4,870,686 | 9/1989 | Gerson et al. | 704/234 |
| 4,979,206 | 12/1990 | Padden et al. | 379/67 |
| 5,030,117 | 7/1991 | Delorme | 434/130 |
| 5,131,045 | 7/1992 | Roth | 704/237 |
| 5,165,095 | 11/1992 | Borcherding | 379/88.03 |
| 5,204,894 | 4/1993 | Darden | 379/88.03 |
| 5,259,026 | 11/1993 | Johnson | 379/207 |
| 5,272,749 | 12/1993 | Masek | 379/216 |
| 5,325,421 | 6/1994 | Hou et al. | 379/67.1 |
| 5,327,486 | 7/1994 | Wolff et al. | 379/96 |
| 5,329,578 | 7/1994 | Brennan et al. | 379/67 |
| 5,353,336 | 10/1994 | Hou et al. | 379/88.02 |
| 5,416,828 | 5/1995 | Hiramatsu et al. | 455/557 |
| 5,452,340 | 9/1995 | Engelbeck et al. | 379/88.03 |
| 5,454,029 | 9/1995 | Noda | 379/88.16 |
| 5,457,738 | 10/1995 | Sylvan | 379/96 |
| 5,462,340 | 10/1995 | Imai et al. | 279/478 |
| 5,475,741 | 12/1995 | Davis et al. | 379/102 |
| 5,479,488 | 12/1995 | Lennig et al. | 379/67 |
| 5,479,489 | 12/1995 | O'Brien | 379/88.03 |
| 5,483,579 | 1/1996 | Stogel | 379/88.03 |
| 5,483,586 | 1/1996 | Sussman | 379/201 |
| 5,488,652 | 1/1996 | Bielby et al. | 379/88 |
| 5,504,805 | 4/1996 | Lee | 379/88.03 |
| 5,550,907 | 8/1996 | Carlsen | 379/207 |
| 5,559,860 | 9/1996 | Mizikovsky | 379/58 |

(List continued on next page.)

FOREIGN PATENT DOCUMENTS

WO 96/10795   4/1996   WIPO .

OTHER PUBLICATIONS

National OnLine Meeting Proceedings, vol. 1, issued 1990, Veith R.H. "Information Retrieval via Telephone Keypad and Voice: Experience with Telephone Directories", pp. 443–451 (especially p. 446).

"WILDFIRE in action: A Sample Session" and "WILD-FIRE" (product description), p. 1, Feb. 26, 1997.

Ericsson Mobile Phone GF 388 (product description), p. 1, 1997.

"Automatic Speech Recognition, Lernout & Hauspie Speech Products", L&H.asr1500/M (product description), 1997, pp. 1–2.

"Automatic Speech Recognition, Lernout & Hauspie Speech Products", L&H.asr200/C (product description), 1997, pp. 1–2.

*Primary Examiner*—Krista Zele
*Assistant Examiner*—Allan Hoosain
*Attorney, Agent, or Firm*—Darby & Darby

[57] ABSTRACT

A personalized directory including an identifier database which is constructed based on a user's set-up input and which is characterized in that it contains disparate types of identifiers which all have in common that they are used by the user to identify an entity during user set-up of the database and a user voice actuated search engine operative to search the identifier database and to provide an output indication related to the entity based on less than all of the disparate types of identifiers used to identify the entity.

46 Claims, 10 Drawing Sheets

U.S. PATENT DOCUMENTS

| | | | |
|---|---|---|---|
| 5,574,780 | 11/1996 | Andruska et al. | 379/207 |
| 5,638,425 | 6/1997 | Meador, III et al. | 379/88.01 |
| 5,651,055 | 7/1997 | Argade | 379/88.01 |
| 5,652,789 | 7/1997 | Miner et al. | 379/201 |
| 5,659,597 | 8/1997 | Baries et al. | 455/563 |
| 5,703,935 | 12/1997 | Raissyan et al. | 379/88 |
| 5,710,835 | 1/1998 | Bradley | 382/233 |
| 5,719,918 | 2/1998 | Serbetciouglu et al. | 379/58 |
| 5,802,510 | 9/1998 | Jones | 707/2 |

PHONEBOOK

FIELD OF THE INVENTION

The present invention relates to apparatus and methods for generating and accessing a telephone directory.

BACKGROUND OF THE INVENTION

Published PCT Application WO 96/10795 to Phonetic Systems Ltd. is a database accessing system in which each database entry includes at least one word. For example, each entry in a zipcode directory may include some or all of the following words: state name, street name, street type, house number, locality. The system's similar word finder finds, for at least one interpretation of each representation in a sequence of representations of possibly erroneous user inputs, at least one database word which is similar to that interpretation. Similarity values are then assigned for relevant entries in the database, for each database word found by the similar word finder.

Wildfire is an electronic assistant that understands spoken commands and manages telephone-related tasks including maintaining a user's contact list and letting the user "voice-dial" outgoing calls. The Wildfire system, for example, may hold the following dialogue with a user:

User: "Call"
Wildfire: "Call whom?"
User: "J. C. Wizer"
Wildfire: "At which place?"
User: "CAR!"
Wildfire: "Dialling." (Wildfire dials).

The disclosures of all publications mentioned in the specification and of the publications cited therein are hereby incorporated by reference.

SUMMARY OF THE INVENTION

The present invention seeks to provide improved apparatus and methods for generating and accessing a telephone directory.

There is thus provided, in accordance with a preferred embodiment of the present invention, a personalized directory including an identifier database which is constructed based on a user's set-up input and which is characterized in that it contains disparate types of identifiers which all have in common that they are used by the user to identify an entity during user set-up of the database, and a user voice actuated search engine operative to search the identifier database and to provide an output indication related to the entity based on less than all of the disparate types of identifiers used to identify the entity.

Also provided, in accordance with a preferred embodiment of the present invention, is voice activated digital telephone directory including a multiplicity of records, each record being accessible in response to an oral retrieval request and including a telephone number array including a digital representation of at least one telephone number, and a plurality of free fields.

Further in accordance with a preferred embodiment of the present invention, each of the multiplicity of records includes a flexible number of free fields.

Also provided, in accordance with another preferred embodiment of the present invention, is a method for adding records to a digital telephone directory, the method including prompting a user to provide a plurality of subscriber identifying information elements and associated telephone number information including at least one telephone number, and generating a telephone directory record including generating a multi-field subscriber identifying label by storing a representation of each individual subscriber identifying information element in a separate field, and associating with the multi-field subscriber identifying label a telephone number array storing at least one telephone number.

Still further in accordance with a preferred embodiment of the present invention, the telephone number information includes at least two telephone numbers for at least one subscriber, and a characterization of each of the at least two telephone numbers, and wherein the telephone number array stores each of the characterizations each in association with its respective telephone number.

Further in accordance with a preferred embodiment of the present invention, the disparate types of identifiers include at least two of surnames, nicknames and family names.

Still further in accordance with a preferred embodiment of the present invention, the voice actuated search engine is operative to provide an output indication related to the entity based on one of the disparate types of identifiers used to identify the entity.

Also provided, in accordance with another preferred embodiment of the present invention, is a personalized directory including an identifier database which is constructed based on a user's set-up input, the identifier database being characterized in that it contains plural identifiers based on the user's set-up input which all have in common that they may be used individually by a user to identify an entity, and a user voice actuated search engine operative to search the identifier database, the voice actuated search engine being operative to provide an output indication related to the entity based on less than all of the plural identifiers used to identify the entity.

Further in accordance with a preferred embodiment of the present invention, the entity is a unique entity.

Still further in accordance with a preferred embodiment of the present invention, the user voice actuated search engine employs voice prompts when it is unable to identify a unique entity based on an initial voice input.

Additionally in accordance with a preferred embodiment of the present invention, the apparatus also includes a directory accessing unit operative to access a record in response to a request including at least a subset, presented in any order, of a plurality of free fields of the record.

Further in accordance with a preferred embodiment of the present invention, the prompting step includes receiving the plurality of subscriber identifying information elements from the user, based on a speaker independent recognition process for at least one of the plurality of subscriber identifying information elements.

Further in accordance with a preferred embodiment of the present invention, the prompting step includes receiving the plurality of subscriber identifying information elements from the user, based on a speaker dependent recognition process for at least one of the plurality of subscriber identifying information elements.

Still further in accordance with a preferred embodiment of the present invention, the prompting step includes receiving a text from a user which defines at least one of the plurality of subscriber identifying information elements.

Additionally in accordance with a preferred embodiment of the present invention, the characterization is selected from among a set of predetermined telephone number characterizations.

Further in accordance with a preferred embodiment of the present invention, the predetermined telephone number characterizations includes at least one of the following telephone number characterizations: Home, Office, Mobile, Facsimile.

Still further in accordance with a preferred embodiment of the present invention, the apparatus also includes a telephone number dialler operative, if an orally presented stimulus is equivalent to a subset of a plurality of free fields of exactly one particular record, to dial at least one of the telephone numbers in the telephone number array of the particular record.

Further in accordance with a preferred embodiment of the present invention, the apparatus also includes a record identification completion prompter operative, if an orally presented stimulus is equivalent to a subset of a plurality of free fields of more than one record, to prompt a user to provide additional information until an individual record is uniquely defined.

Still further in accordance with a preferred embodiment of the present invention, the apparatus also includes a field filling prompter operative to prompt a user to supply each of the plurality of free fields by orally presenting a plurality of titles for the plurality of free fields respectively.

Further in accordance with a preferred embodiment of the present invention, the plurality of titles includes at least two of the following titles: first name, last name, nickname.

Still further in accordance with a preferred embodiment of the present invention, the prompting step includes importing a text from an external digital source which defines at least one of the plurality of subscriber identifying information elements.

Additionally in accordance with a preferred embodiment of the present invention, the external digital source includes one of the following group of sources: a PDA (personal digital assistant) device, PIM (personal information manager) software residing in a personal computer, a telephone directory residing in a cellular telephone and including telephone numbers and subscriber-identifying labels, and an organization's telephone directory residing in a database.

Also provided, in accordance with another preferred embodiment of the present invention, is a method for retrieving a record from a digital address directory in response to a voice command, the digital address directory including a multiplicity of subscriber records, each subscriber record including at least one address and an associated label, the method including recognizing at least a portion of an individual label in an oral retrieval request presented by a user, searching for the label portion in the directory, thereby to find a record subset including all records from among the multiplicity of records which include the label portion, retrieving the address within the single record if the record subset includes only a single record and supplying the retrieved address to a navigation system, and, otherwise, narrowing the subset by prompting the user to provide additional information until the subset includes only a single record.

Also provided, in accordance with a preferred embodiment of the present invention, is a voice activated digital address directory including a multiplicity of records, each record being accessible in response to an oral retrieval request and including an address array including a digital representation of at least one telephone number, and a plurality of free fields.

Further in accordance with a preferred embodiment of the present invention, each of the multiplicity of records includes a flexible number of free fields.

Still further in accordance with a preferred embodiment of the present invention, there is provided a method for adding records to a digital address directory, the method including prompting a user to provide a plurality of premises's identifying information elements and associated address information including at least one addresses, and generating an address directory record including generating a multi-field premises identifying label by storing a representation of each individual premises identifying information element in a separate field, and associating with the multi-field premises identifying label an address array storing at least one address.

Further in accordance with a preferred embodiment of the present invention, the address information includes at least two addresses for at least one premises, and a characterization of each of the at least two addresses, and wherein the address array stores each of the characterizations each in association with its respective address.

Further in accordance with a preferred embodiment of the present invention, the apparatus also includes a directory accessing unit operative to access a record in response to a request including at least a subset, presented in any order, of a plurality of free fields of the record.

Still further in accordance with a preferred embodiment of the present invention, the prompting step includes receiving the plurality of premises identifying information elements from the user, based on a speaker independent recognition process for at least one of the plurality of premises identifying information elements.

Additionally in accordance with a preferred embodiment of the present invention, the prompting step includes receiving the plurality of premises identifying information elements from the user, based on a speaker dependent recognition process for at least one of the plurality of premises identifying information elements.

Further in accordance with a preferred embodiment of the present invention, the prompting step includes receiving a text from a user which defines at least one of the plurality of premises identifying information elements.

Still further in accordance with a preferred embodiment of the present invention, the characterization is selected from among a set of predetermined address characterizations.

Further in accordance with a preferred embodiment of the present invention, the predetermined address characterizations includes at least one of the following address characterizations: Home, Office, Vacation.

Further in accordance with a preferred embodiment of the present invention, the apparatus also includes a record identification completion prompter operative, if an orally presented stimulus is equivalent to a subset of a plurality of free fields of more than one records, to prompt a user to provide additional information until an individual record is uniquely defined.

Still further in accordance with a preferred embodiment of the present invention, the directory apparatus also includes a field filling prompter operative to prompt a user to supply each of the plurality of free fields by orally presenting a plurality of titles for the plurality of free fields respectively.

Additionally in accordance with a preferred embodiment of the present invention, the plurality of titles includes at least two of the following titles: first name, last name, nickname.

Further in accordance with a preferred embodiment of the present invention, the prompting step includes importing a text from an external digital source which defines at least one of the plurality of premises identifying information elements.

Still further in accordance with a preferred embodiment of the present invention, the external digital source includes one of the following group of sources: a PDA (personal digital assistant) device, PIM (personal information manager) software residing in a personal computer, an address directory residing in a cellular telephone and including addresses and premises-identifying labels, and an organization's address directory residing in a database.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
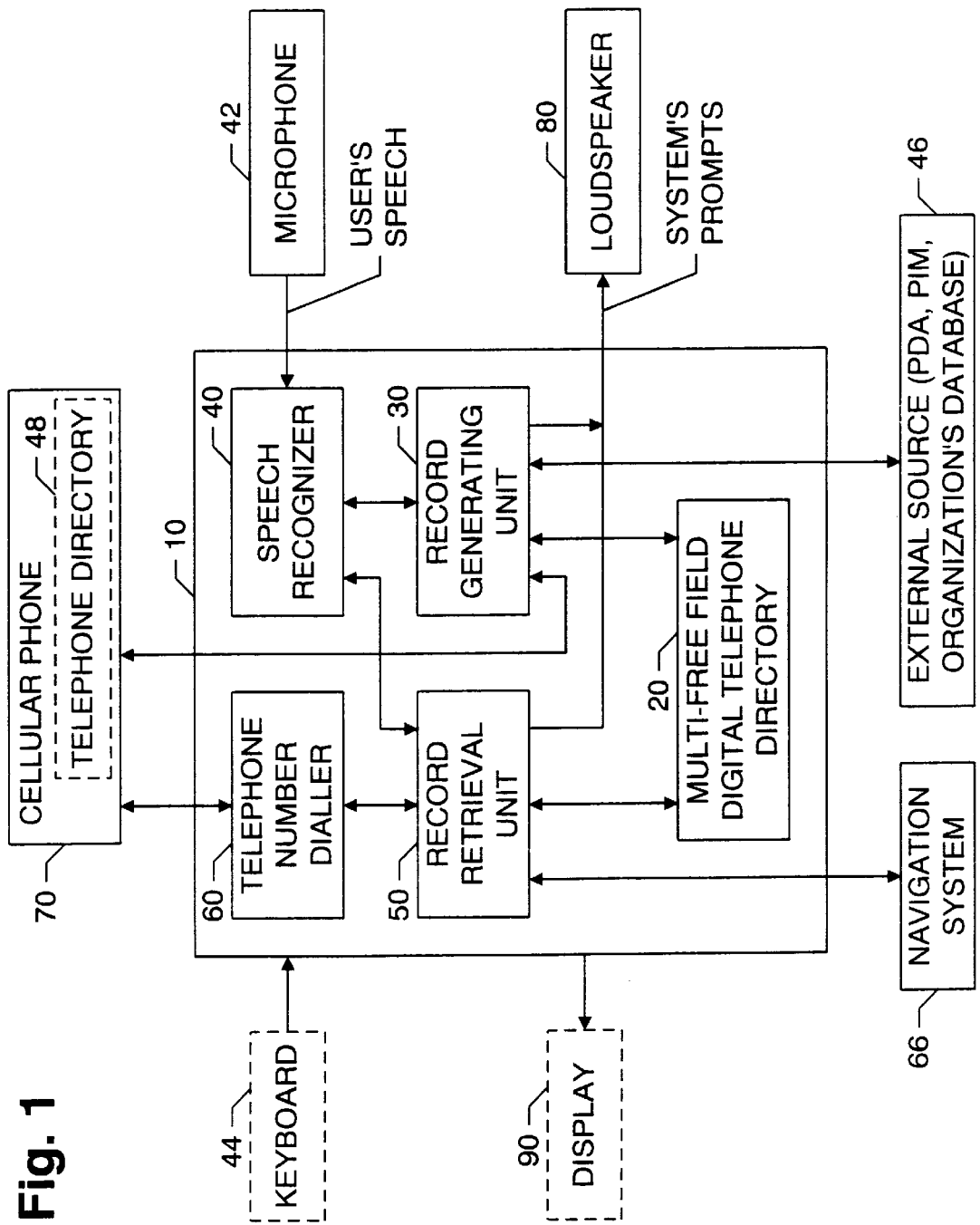
FIG. 1 is a simplified functional block diagram of telephone directory apparatus 10 constructed and operative in accordance with a preferred embodiment of the present invention.

Reference is now made to FIG. 1 which is a simplified functional block diagram of telephone directory apparatus 10 constructed and operative in accordance with a preferred embodiment of the present invention. The apparatus 10 of FIG. 1 preferably includes a multi-free field digital telephone directory 20 which includes a multiplicity of records, each including a plurality of fields of which, preferably, at least two are free fields which typically store subscriber identifying information and at least one, not a free field, stores a telephone number. A preferred implementation for the multi-free field directory 20 is described below with reference to FIG. 4.

A "free field" is a field which stores a speech model representing subscriber identifying information freely provided by a user. Typically, the system does not limit the contents of the information provided by the user, e.g. by forcing the user to select subscriber identifying information from a small set of predetermined possible options.

A particular advantage of providing a plurality of free fields is that a user can access a subscriber's record by remembering only some of the plurality of subscriber identifying elements stored in the plurality of free fields respectively. A record may be accessed even if only one subscriber identifying element is recalled, assuming the single element recalled is sufficiently unique to single out the subscriber. A record may also preferably be accessed even if the user remembers various subscriber identifying elements in the wrong order because the system searches the database for the combination of subscriber identifying elements presented by the user, in any order.

In contrast, if only a single free field is provided storing a plurality of subscriber identifying elements such as first and last names and nickname, the user can access a particular subscriber's record only if every one of the plurality of subscriber identifying elements is remembered, in the exact order that they appear in the database. In practice, most users are not capable of remembering the exact sequence of subscriber identifying elements which they themselves used to describe a particular subscriber, when generating the database.

Apparatus 10 preferably comprises a suitably programmed processor or processors.

The multi-free field directory 20 is built up by a record generating unit 30 which interfaces with a speech recognizer 40. The speech recognizer 40 operates in its training mode when interfacing with record generating unit 30. In its training mode, the speech recognizer 40 is operative to receive oral subscriber-identifying labels uttered by a user and to supply digital speech models computed from these labels, using conventional speech recognition techniques, to the record generating unit 30 which then generates new records for the multi-free field directory, accordingly. Preferably, the speech recognizer stores, for each digital speech model, an oral representation thereof, for playing back to the user when necessary for confirmation, prompting or search status update, as in step 340 in FIG. 3.

The speech recognizer 40 may operate within any of the following training modes:

1. The speech recognizer gets oral labels from a microphone 42 and generates a digital representation thereof which is also termed herein a "speaker-dependent speech model".

2. The speech recognizer 40 gets text, e.g. from a user or from an external source, generates a phonetic representation thereof and then generates a digital representation thereof which is also termed herein a "speaker-independent speech model". The text may for example be keyed in by the user by means of a keyboard 44. Alternatively, the text may be imported from an external source 46 such as a PDA (personal digital assistant) device, a PIM (personal information manager) software residing in a personal computer, or an organization's telephone directory residing in a database. Another possible external source is a telephone directory 48 residing in a cellular telephone 70 and including telephone numbers and subscriber-identifying labels. An example of a commercially available cellular telephone having this feature is the Ericsson Mobile Phone GF 388, available from Ericsson Mobile Communications AB, S-223 70 Lund, Sweden.

3. The speech recognizer 40 gets the user's selection of one of a set of speech models from a suitable input device such as microphone 42 or keyboard 44 and stores a digital representation of the selected speech model.

A preferred method of operation for record generating unit 30 is described below with reference to FIG. 2. The speech recognizer 40 may comprise any conventional speech recognizer performing speaker-dependent or -independent (whole word based or subword based such as phoneme based) speech recognition. Commercially available speech recognizers include the asr200 and asr1500 models available from Lernout & Hauspie, Sint-Krisplinstraat 7, 8900 Leper, Belgium.

A record retrieval unit 50 is operative to access records in the multi-free field directory 20. A user's input is received from microphone 42 by the speech recognizer 40, which operates in speech recognition mode, and at least one record in the directory 20 is accessed accordingly by the record retrieval unit 50. A preferred method of operation for the record retrieval unit 50 is described below with reference to FIG. 3.

The record retrieval unit 50 interfaces with a telephone number dialler 60 and/or with a navigation system 66.

The telephone number dialler 60 is operative to receive a telephone number from among the one or more telephone numbers included in each record accessed by the record retrieval unit 50. The dialler 60 dials the telephone number via a local telephone instrument such as cellular telephone 70, thereby to allow a telephone conversation to be carried out between the subscriber to whom the telephone number belongs and the local telephone 70 which serves the user of the apparatus of FIG. 1.

Figure 4:
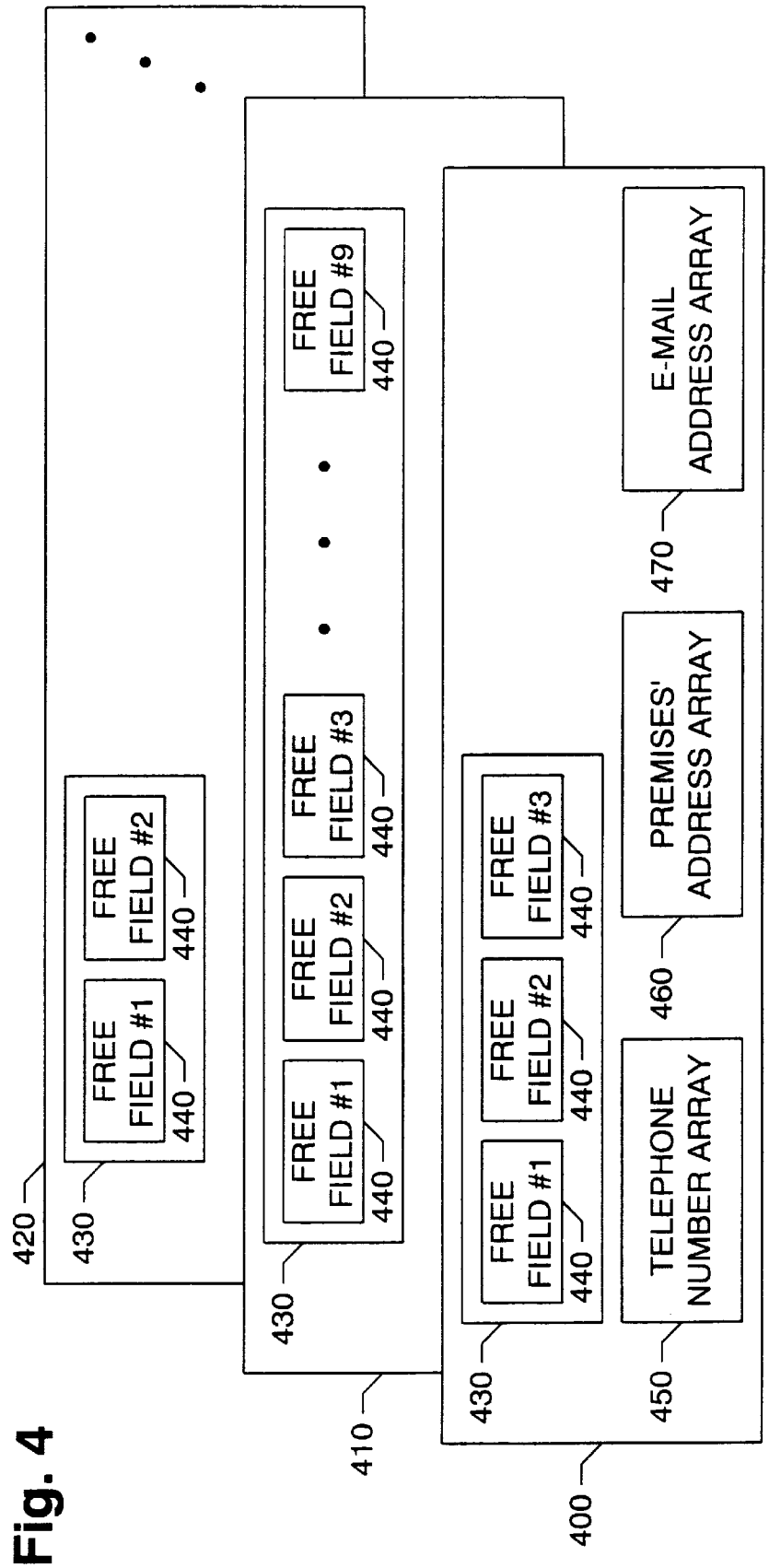
FIG. 4 is a simplified pictorial illustration of a first preferred embodiment of the multi-free field directory of FIG. 1.

The navigation system 66 may comprise any suitable conventional vehicle navigation system such as the TravelPilot RGS 05 marketed by Blaupunkt-Werke GmbH, Bosch Gruppe. The navigation system 66 preferably receives a target address and provides navigation information to a vehicle accordingly to allow the vehicle to travel from its current location toward the target address. According to a preferred embodiment of the present invention, each record in the directory 20 includes at least one address field, as shown in FIG. 4, and the target address is the address field of a record accessed by the record retrieval unit 50 of FIG. 1.

The system is preferably operative to provide the user with suitable prompts and other messages by any suitable means such as a loudspeaker 80 and/or a display 90.

Figure 2:
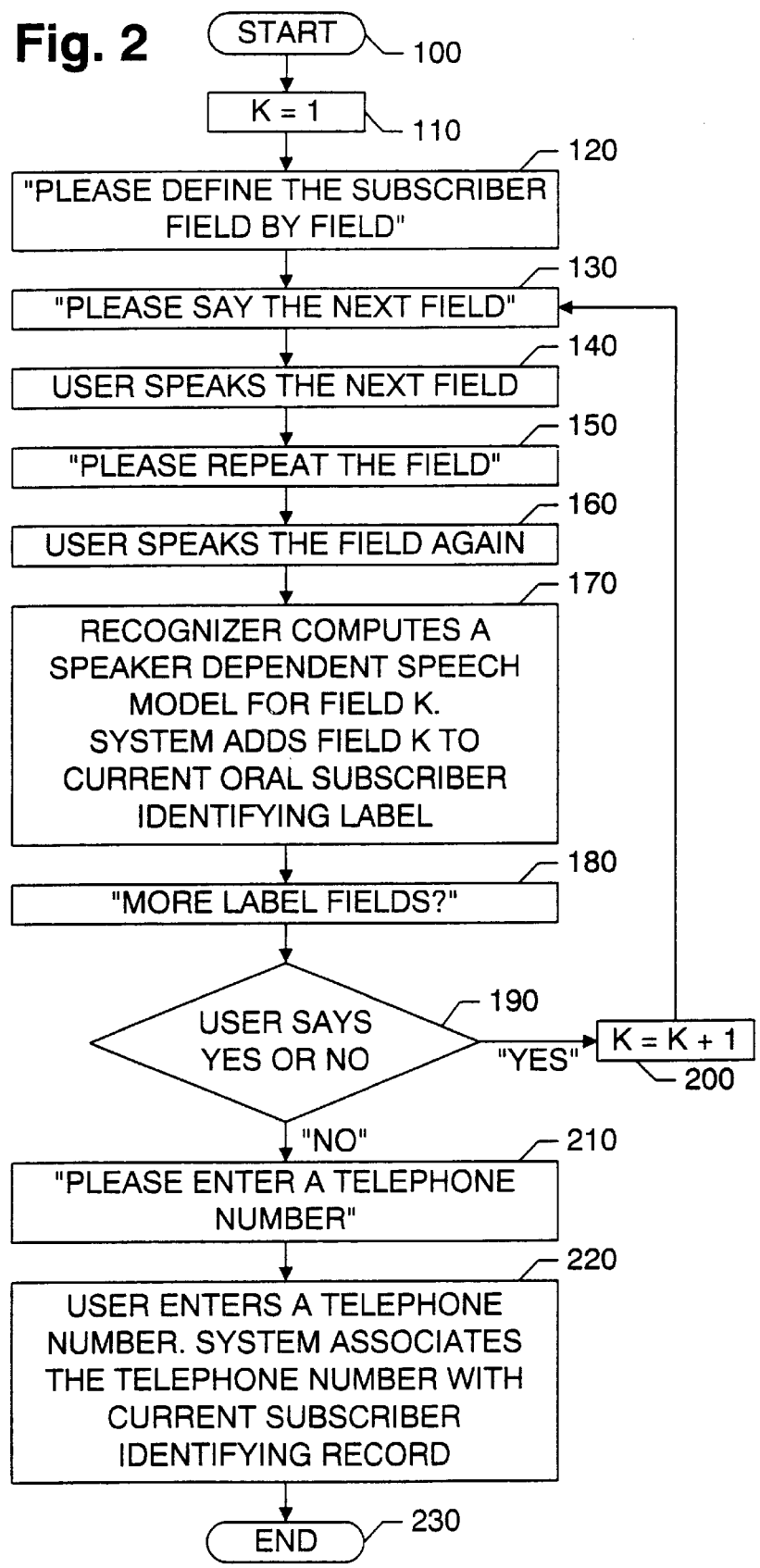
FIG. 2 is a simplified flowchart illustration of a preferred speaker-dependent method of operation for the record generating unit 30 of FIG. 1.

Reference is now made to FIG. 2 which is a simplified self-explanatory flowchart illustration of a preferred speaker-dependent method of operation for the record generating unit 30 of FIG. 1. The record generation unit 30 may be activated ("start"—step 100) by any suitable means such as a driver accessible activation button (not shown). K is an index for the free fields in the new record which the user wishes to generate. Preferably, different records can have a plurality of free fields and preferably can have totally flexible numbers of free fields as seen in FIG. 4. For each free field K, the user pronounces a subscriber-identifying information element (step 120), i.e. the desired contents of the field, and is preferably then prompted to repeat the same field information (step 150). Eventually, the subscriber-identifying information elements for all fields K form an oral subscriber-identifying label (step 220).

The record generating unit 30 receives a speech model computed by the speech recognizer 40 from the user-supplied subscriber-identifying information element. The record-generating unit 30 stores the speech model in field K of the record currently being generated.

Once the user has indicated that s/he does not wish to define any more free fields for the current record, the record generating unit 30 prompts the user to enter a telephone number, e.g. by means of keyboard 44. The record generating unit 30 then generates a new record including the telephone number associated with the free fields defined by the user.

Figure 5A:
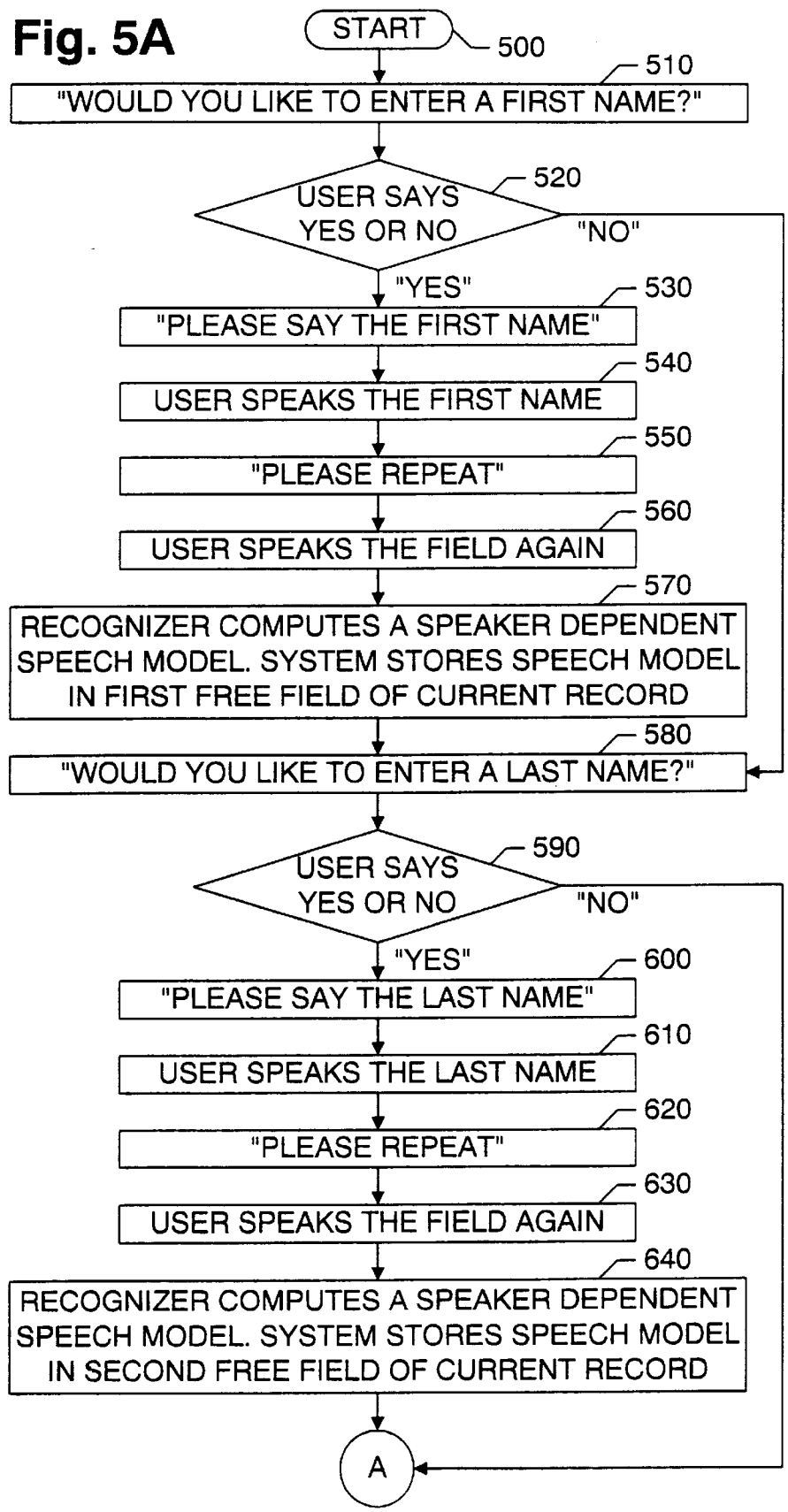
FIGS. 5A–5B, taken together, form a simplified flowchart illustration of one modification of the method of FIG. 2 in which the user is prompted to supply a specific system-defined subscriber identifying element in each particular free field.
Figure 5B:
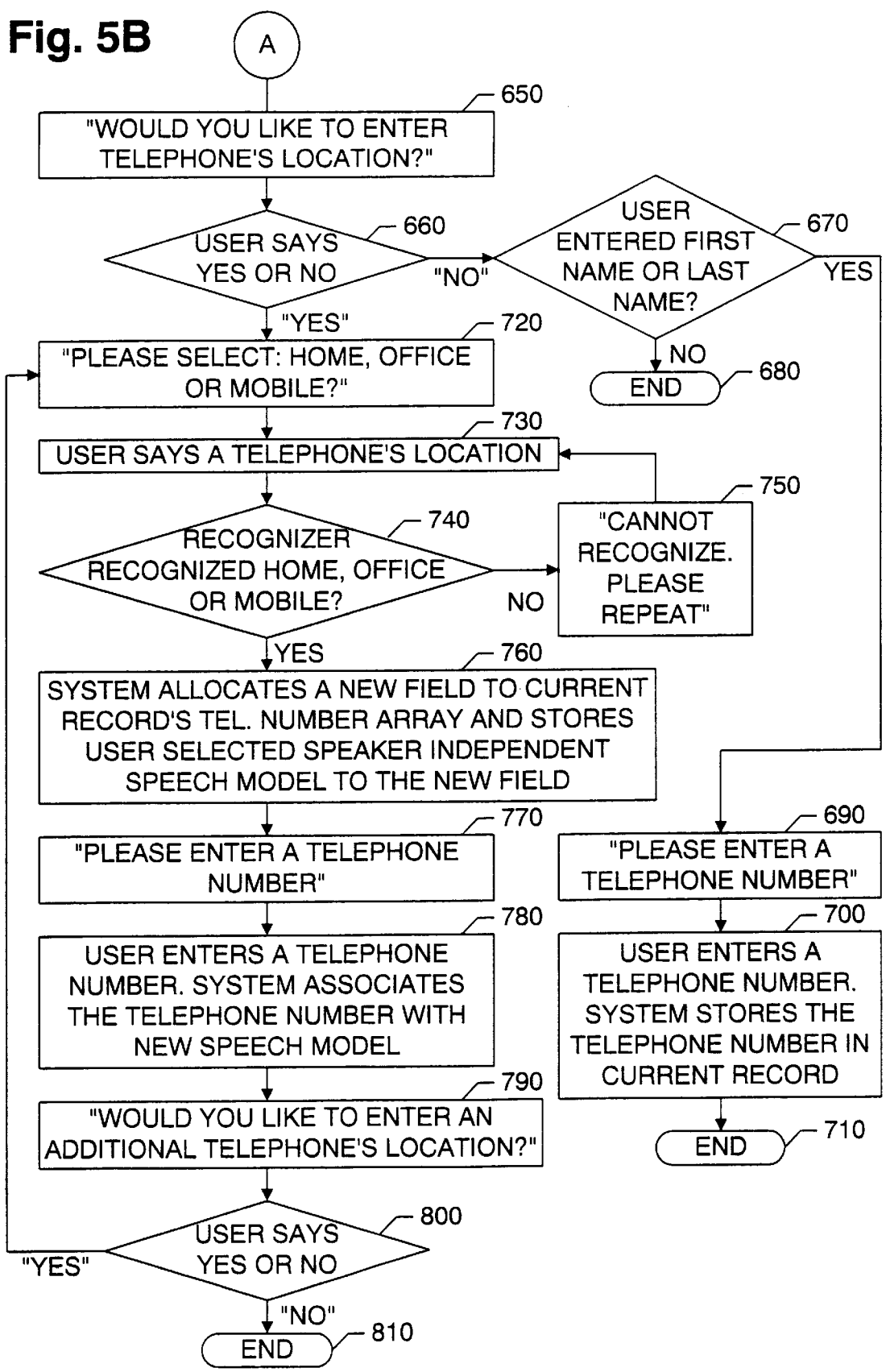

It is appreciated that, as shown in FIGS. 5A–5B, the user may alternatively be prompted to enter more than one telephone number in which case, the user is also preferably prompted to provide a telephone number label, such as "home", "office" or "mobile" for each of the telephone numbers, e.g. by selecting an identifying speech model. Alternatively or in addition, of course, the user may be prompted to enter one or more premises' addresses, e-mail addresses or other information pertinent to a particular subscriber belonging to a network of physical or e-mail addresses.

Figure 3:
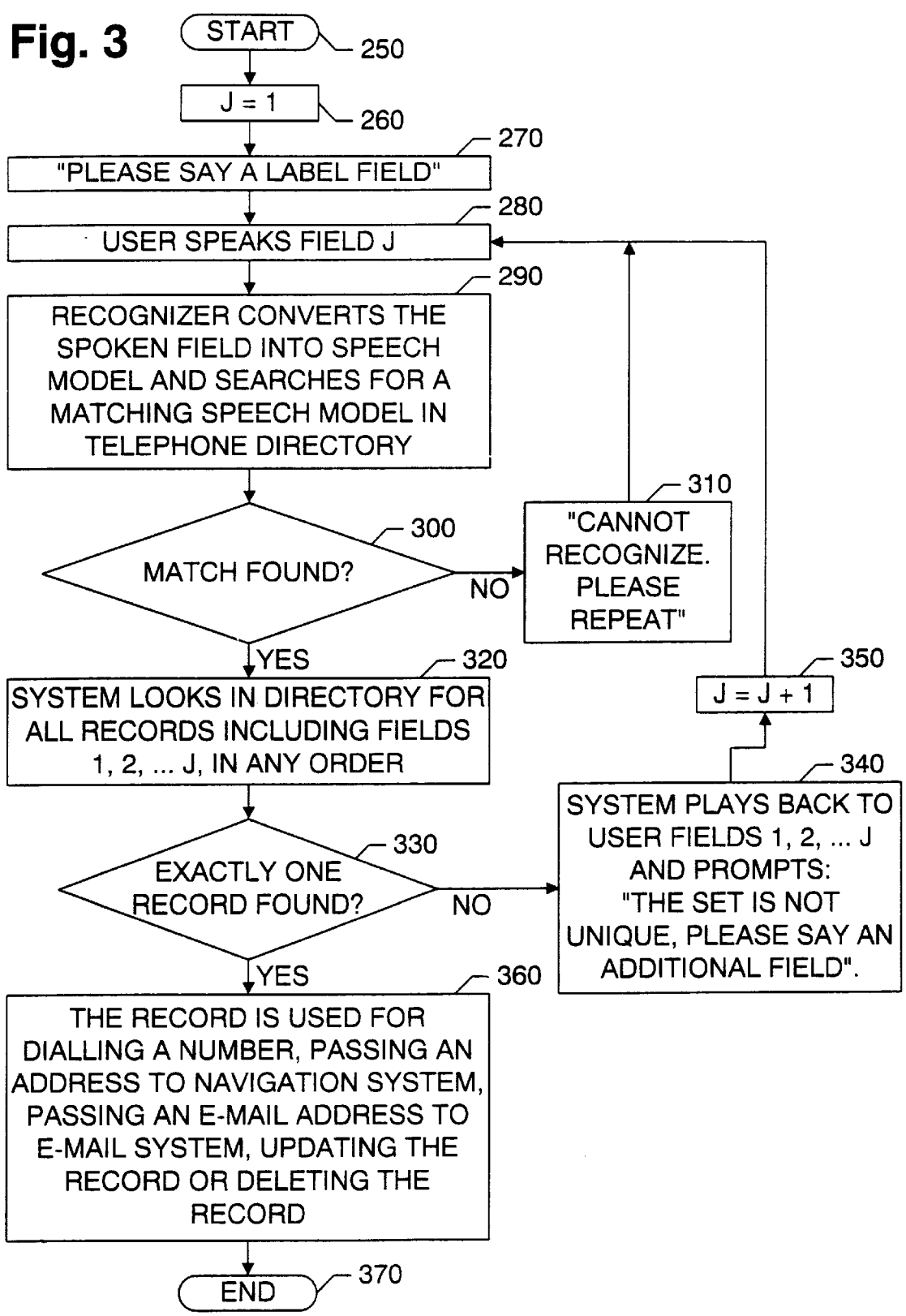
FIG. 3 is a simplified flowchart illustration of a preferred method of operation for the record retrieval unit 50 of FIG. 1.

Reference is now made to FIG. 3 which is a simplified flowchart illustration of a preferred method of operation for the record retrieval unit 50 of FIG. 1. The record retrieval unit 50 may be activated ("start"—step 250) by any suitable means such as a driver accessible activation button (not shown). The method of FIG. 3 is generally self-explanatory and J is an index for a current field uttered by the user. Fields uttered by the user are employed by the system as search keys for finding, ultimately, a single record which includes all fields 1, 2, . . . , J in any order. It is appreciated that whereas in the illustrated embodiment the user is prompted to orally present the label one field at a time (step 280), alternatively, the system allows the user to present more than one field of the label at one time. For example, the system preferably allows the user to say "James Smith" rather than requiring the user to say "James" separately and "Smith" separately.

FIG. 4 is a simplified pictorial illustration of a first preferred embodiment of the multi-free field directory of FIG. 1. As shown, the directory of FIG. 4 includes a plurality of records of which, for simplicity, three records 400, 410, and 420 are shown. Each record includes a subscriber-identifying label 430 each preferably including a flexible number of free fields 440 such as 3 fields (record 400), 9 fields (record 410) or 2 fields (record 420). Each free field typically stores a speech model of a subscriber-identifying element such as a subscriber's first name, last name, nickname, organizational affiliation, title, etc.

Each record also typically includes subscriber information such as a telephone number array 450, a premises' address array 460 and/or an electronic mail address array 470. Each telephone number array 450 includes one or more telephone numbers as described in detail below with reference to FIGS. 8A–8C. Similarly, each premises' address array 460 and electronic mail address array 470 may include one or more addresses, either labelled or unlabelled.

FIGS. 5A–5B, taken together, form a simplified self-explanatory flowchart illustration of one modification of the method of FIG. 2 in which the user is prompted to supply a specific system-defined subscriber identifying element in each particular free field. As shown, in the illustrated embodiment, the user is prompted to supply two system-defined subscriber identifying elements: first name and last name. Preferably, the retrieval method of FIG. 3 is modified by replacing the prompt of step 270 with a prompt which is specific to the system-defined elements, such as, for the illustrated embodiment: "Please say first name or last name".

Another feature of the embodiment of FIGS. 5A–5B is that each telephone number array includes a plurality of telephone numbers. In the illustrated embodiment, each telephone number array includes a plurality of telephone numbers and associated labels which are selected by the user from among the following label set: "home", "office" and "mobile". However, this need not be the case as described in detail below with reference to FIGS. 8A–8B. Preferably, the retrieval method of FIG. 3 is modified by adding between steps 330 and 360 a prompt such as: "Should (NAME OF SUBSCRIBER) be called at home, at the office or at his mobile telephone?". The system is preferably operative for speaker-independent recognition of the user's response which will be either "home", "office" or "mobile".

It is appreciated that either of the two features of the embodiment of FIGS. 5A–5B may alternatively be provided separately rather than providing both features in combination.

Figure 6A:
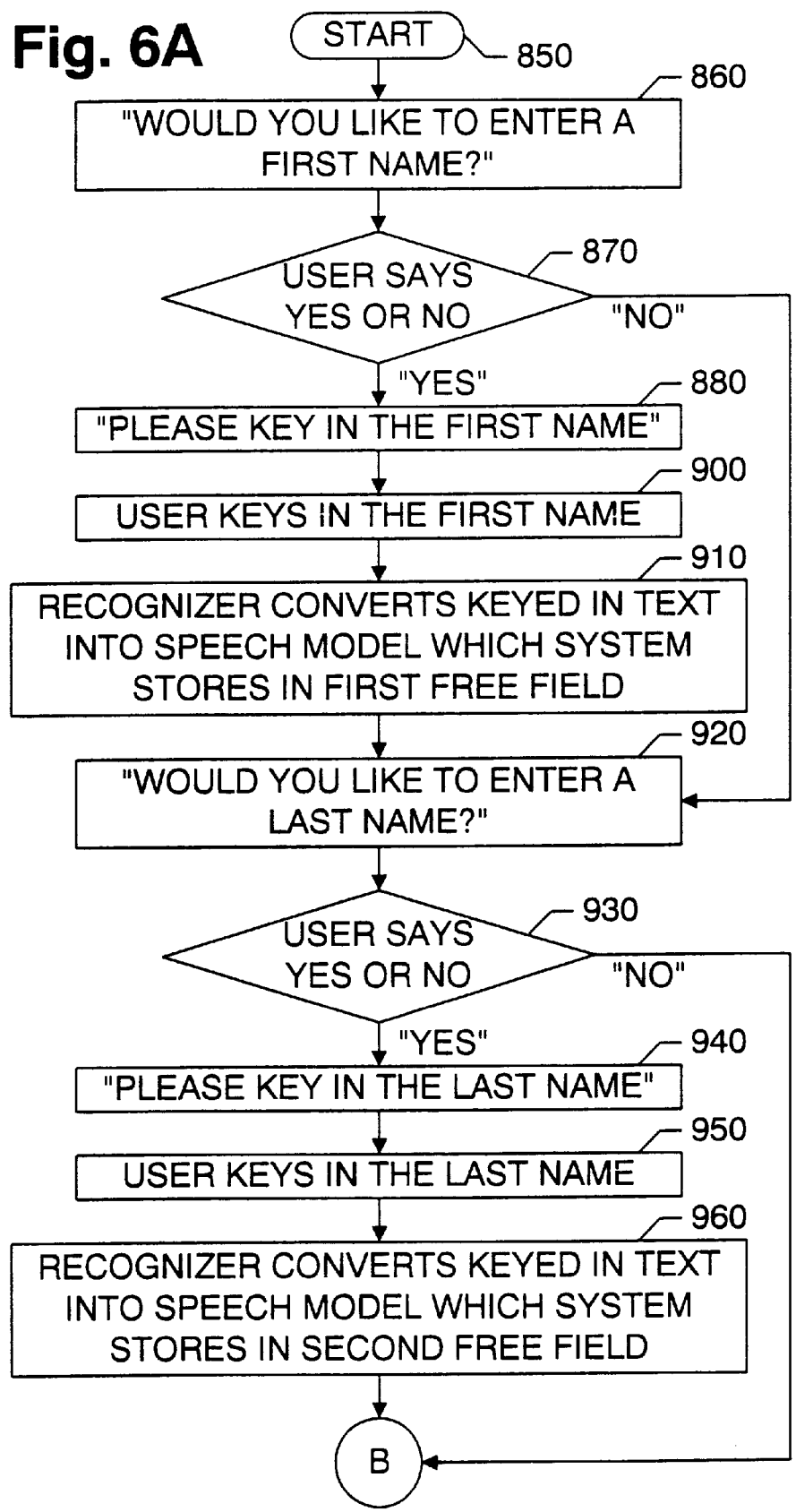
FIGS. 6A–6B, taken together, form a simplified flowchart illustration of another modification of the method of FIG. 2 in which content for the free fields is supplied by the user by means of a keyboard rather than orally.
Figure 6B:
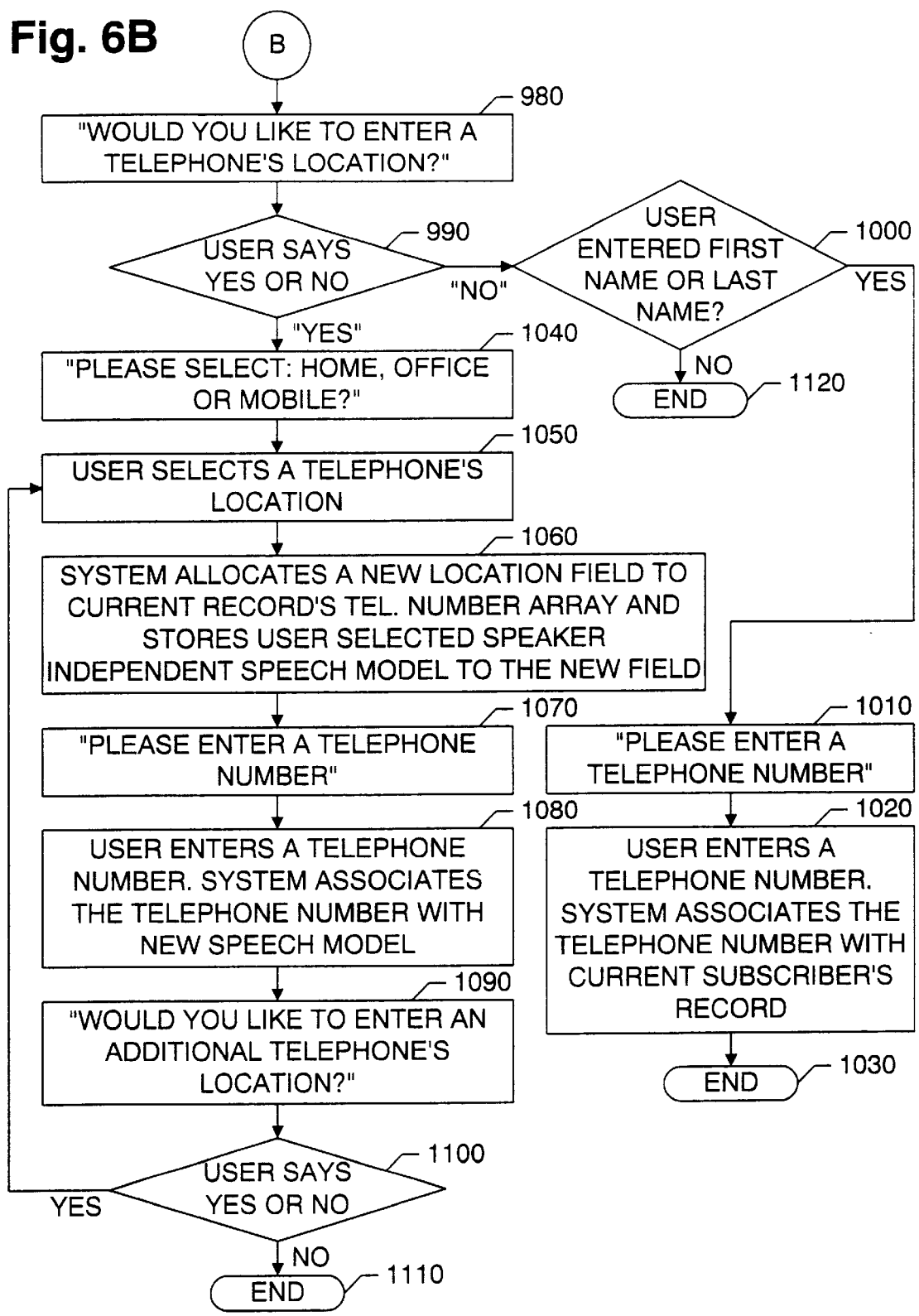

FIGS. 6A–6B, taken together, form a simplified flowchart illustration of another modification of the method of FIG. 2 in which content for the free fields is supplied by the user by means of a keyboard rather than orally.

Figure 7:
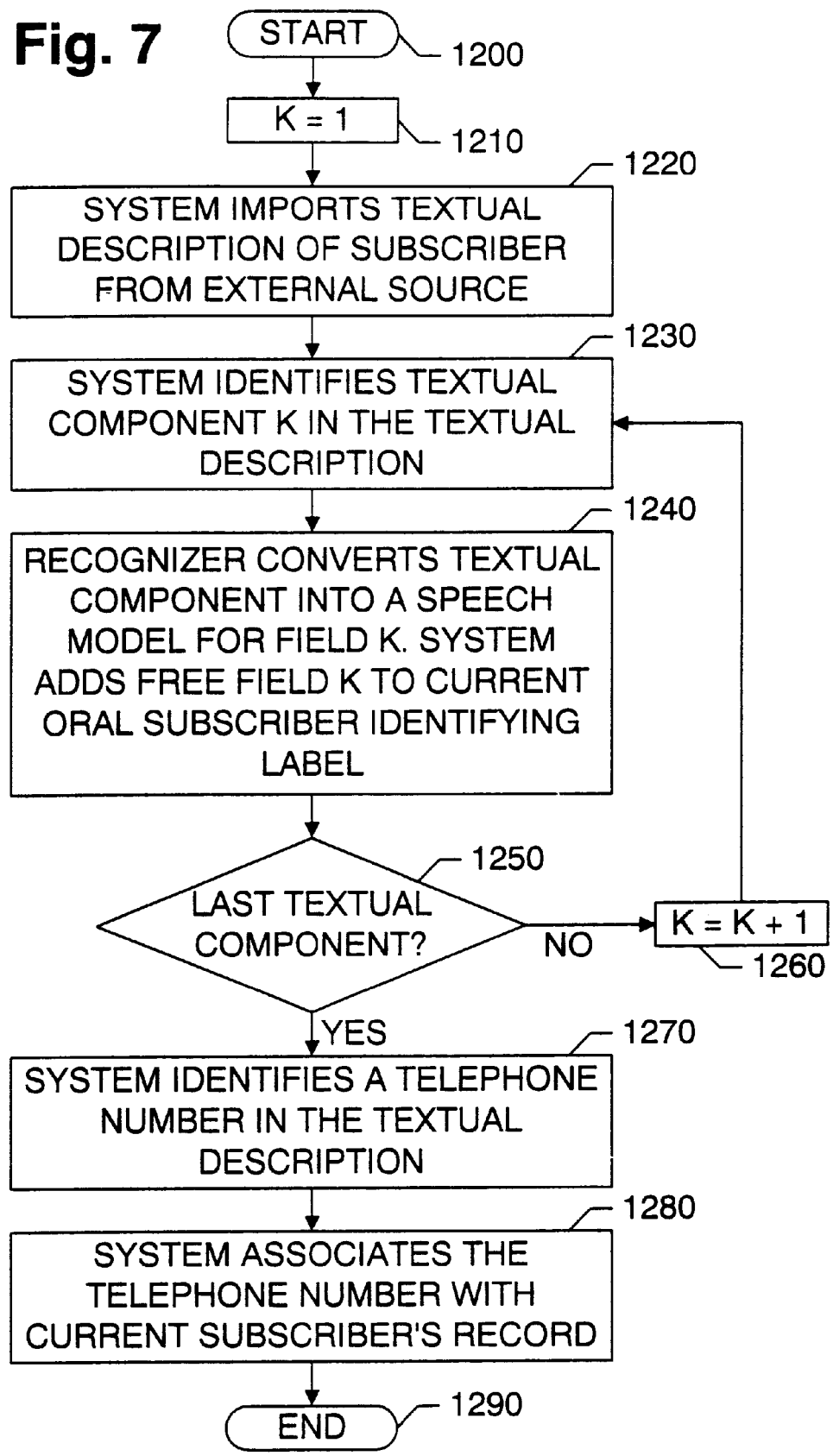
FIG. 7 forms a simplified flowchart illustration of still another modification of the method of FIG. 2 in which content for the free fields is imported from an external source rather than being supplied by the user.

FIG. 7 forms a simplified self-explanatory flowchart illustration of still another modification of the method of FIG. 2 in which content for the free fields is imported from an external source (46 or 48 in FIG. 1) rather than being supplied by the user. In step 1230, the system identifies textual components of the textual description of the individual subscriber. Generally, an individual textual component is a single word or name such as a subscriber's first or last name. However, rules are preferably used to define textual components in such complex situations as hyphenated last names, compound first names such as Mary Beth, compound or hyphenated organization names, acronyms, etc.

Figure 8A:
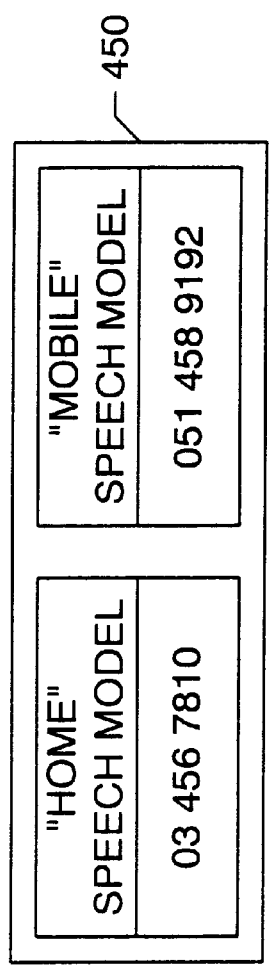
FIGS. 8A–8C are simplified pictorial illustrations of examples of individual telephone number arrays.
Figure 8B:
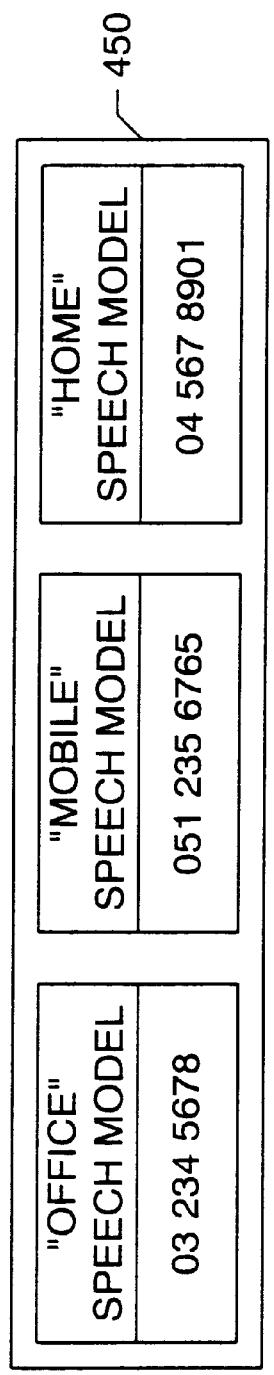
Figure 8C:
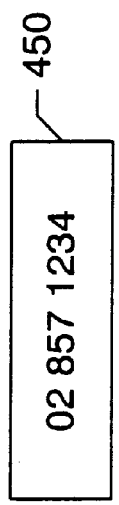

FIGS. 8A–8C are simplified pictorial illustrations of examples of individual telephone number arrays 450 (FIG. 4). In FIG. 8A, the telephone number array includes two telephone number storing elements each including a telephone number and a label. The label for each telephone number may either be selected from among a small number of system-defined options or, according to another embodiment of the present invention, may be freely set by a user. In FIG. 8B, three labels are provided. In FIG. 8C, the telephone number array stores only a single telephone number and therefore the telephone number is not labelled.

It is appreciated that the term "subscriber identifying information element" is intended to include substantially any information element which is useful in differentiating between subscribers and is not intended to include telephone number classification information such as classification of a telephone number as either Home, Office, Mobile, Facsimile, etc.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

1. A personalized computerized directory comprising:
   a database which is constructed based on a user's set up input and which is characterized in that it stores plural names for at least one individual entity, whereby entry of any of said plural names will enable information relating only to said at least one individual entity to be retrieved; and
   a user voice actuated search engine operative to search said database and to provide information related only to said at least one individual entity in response to vocal entry of any of said plural names.

2. A personalized computerized directory according to claim 1 and wherein said directory is a telephone directory, said information includes at least a telephone number and said plural names are a plurality of words, each of which is associated by the user with said at least one individual entity.

3. A personalized computerized directory according to claim 1 and wherein at least some of said plural names are selected from the group consisting of surnames, nicknames and first names.

4. A personalized computerized directory according to claim 3 and wherein said plural names all have in common that they may be used individually by a user to identify said at least one individual entity.

5. A personalized computerized directory according to claim 4 and wherein said user voice actuated search engine employs speaker-independent voice recognition.

6. A personalized computerized directory according to claim 3 and wherein said user voice actuated search engine employs speaker-independent voice recognition.

7. A personalized computerized directory according to claim 2 and wherein at least some of said plural names are selected from the group consisting of surnames, nicknames and first names.

8. A personalized computerized directory according to claim 7 and wherein said plural names all have in common that they may be used individually by a user to identify said at least one individual entity.

9. A personalized computerized directory according to claim 8 and wherein said user voice actuated search engine employs speaker-independent voice recognition.

10. A personalized computerized directory according to claim 7 and wherein said user voice actuated search engine employs speaker-independent voice recognition.

11. A personalized computerized directory according to claim 1 and wherein said plural names all have in common that they may be used individually by a user to identify said at least one individual entity.

12. A personalized computerized directory according to claim 11 and wherein said user voice actuated search engine employs speaker-independent voice recognition.

13. A personalized computerized directory according to claim 2 and wherein said plural names all have in common that they may be used individually by a user to identify said at least one individual entity.

14. A personalized computerized directory according to claim 13 and wherein said user voice actuated search engine employs speaker-independent voice recognition.

15. A personalized computerized directory according to claim 2 and wherein said user voice actuated search engine employs speaker-independent voice recognition.

16. A personalized computerized directory according to claim 1 and wherein said user voice actuated search engine employs speaker-independent voice recognition.

17. A personalized computerized directory according to claim 1 and wherein said directory is an address directory, said information includes at least an address and said plural names are a plurality of words, each of which is associated by the user with said at least one individual entity.

18. A personalized computerized directory according to claim 17 and wherein at least some of said plural names are selected from the group consisting of surnames, nicknames and first names.

19. A personalized computerized directory according to claim 17 and wherein said plural names all have in common that they may be used individually by a user to identify said at least one individual entity.

20. A personalized computerized directory according to claim 17 and wherein said user voice actuated search engine employs speaker-independent voice recognition.

21. A personalized computerized directory according to claim 17 and wherein said address directory is coupled to a navigation system, whereby the navigation system may be voice actuated by voice actuation of said address directory.

22. A method for setting up a voice activated personalized computerized telephone directory comprising the steps of:
   prompting a user to enter a telephone number for an individual entity which is to be retrievable from the directory; and
   prompting a user to enter plural names which the user associates with said telephone number for said individual entity, each of said plural names being a name which the user intends to orally enter into the directory in order to retrieve said telephone number of only said individual entity.

23. A method according to claim 22 and wherein at least some of said plural names are selected from the group consisting of surnames, nicknames and first names.

24. A method according to claim 23 and wherein said plural names all have in common that they may be used individually by a user to identify said at least one individual entity.

25. A method according to claim 24 and wherein said voice activated personalized computerized telephone directory employs speaker-independent voice recognition.

26. A method for voice actuated operation of a voice actuated personalized computerized directory comprising:
   constructing a database using a user's set up input, the database being characterized in that it stores plural names for at least one individual entity, whereby entry of any of said plural names will enable information relating to said at least one individual entity to be retrieved; and
   operating a user voice actuated search engine to search said database and to provide information related to only said at least one individual entity in response to vocal entry of any of said plural names.

27. A method according to claim 26 and wherein said directory is a telephone directory, said information includes at least a telephone number and said plural names are a plurality of words, each of which is associated by the user with said at least one individual entity.

28. A method according to claim 27 and wherein at least some of said plural names are selected from the group consisting of surnames, nicknames and first names.

29. A method according to claim 28 and wherein said plural names all have in common that they may be used individually by a user to identify said at least one individual entity.

30. A method according to claim 29 and wherein said user voice actuated search engine employs speaker-independent voice recognition.

31. A method according to claim 28 and wherein said user voice actuated search engine employs speaker-independent voice recognition.

32. A method according to claim 27 and wherein said plural names all have in common that they may be used individually by a user to identify said at least one individual entity.

33. A method according to claim 32 and wherein said user voice actuated search engine employs speaker-independent voice recognition.

34. A method according to claim 27 and wherein said user voice actuated search engine employs speaker-independent voice recognition.

35. A method according to claim 26 and wherein at least some of said plural names are selected from the group consisting of surnames, nicknames and first names.

36. A method according to claim 35 and wherein said plural names all have in common that they may be used individually by a user to identify said at least one individual entity.

37. A method according to claim 36 and wherein said user voice actuated search engine employs speaker-independent voice recognition.

38. A method according to claim 35 and wherein said user voice actuated search engine employs speaker-independent voice recognition.

39. A method according to claim 26 and wherein said plural names all have in common that they may be used individually by a user to identify said at least one individual entity.

40. A method according to claim 39 and wherein said user voice actuated search engine employs speaker-independent voice recognition.

41. A method according to claim 26 and wherein said user voice actuated search engine employs speaker-independent voice recognition.

42. A method according to claim 26 and wherein said directory is an address directory, said information includes at least an address and said plural names are a plurality of words, each of which is associated by the user with said at least one individual entity.

43. A method according to claim 42 and wherein at least some of said plural names are selected from the group consisting of surnames, nicknames and first names.

44. A method according to claim 42 and wherein said plural names all have in common that they may be used individually by a user to identify said at least one individual entity.

45. A method according to claim 42 and wherein said user voice actuated search engine employs speaker-independent voice recognition.

46. A method according to claim 42 and wherein said address directory is coupled to a navigation system, whereby the navigation system may be voice actuated by voice actuation of said address directory.

* * * * *